United States Patent
Dean et al.

(10) Patent No.: US 6,321,220 B1
(45) Date of Patent: Nov. 20, 2001

(54) METHOD AND APPARATUS FOR PREVENTING TOPIC DRIFT IN QUERIES IN HYPERLINKED ENVIRONMENTS

(75) Inventors: Jeffrey Dean; Monika R. Henzinger, both of Menlo Park; Krishna Asur Bharat, Santa Clara, all of CA (US)

(73) Assignee: AltaVista Company, Palo Alto, CA (US)

( * ) Notice: Subject to any disclaimer, the term of this patent is extended or adjusted under 35 U.S.C. 154(b) by 0 days.

(21) Appl. No.: 09/207,215

(22) Filed: Dec. 7, 1998

(51) Int. Cl.[7] .................................................. G06F 17/30
(52) U.S. Cl. ........................................ 707/3; 707/2; 707/5
(58) Field of Search .......................................... 707/2, 3, 5

(56) References Cited

U.S. PATENT DOCUMENTS

| | | | |
|---|---|---|---|
| 5,740,421 | * 4/1998 | Palmon | 707/4 |
| 5,873,081 | * 2/1999 | Harel | 707/4 |
| 6,073,135 | 6/2000 | Broder et al. | |
| 6,112,203 | * 8/2000 | Bharat et al. | 707/5 |
| 6,119,124 | 9/2000 | Broder et al. | 707/103 |
| 6,138,113 | * 10/2000 | Dean et al. | 707/2 |

OTHER PUBLICATIONS

Article by Bharat et al. entitled "The Connectivity Server: Fast Access to Linkage Information on the Web", http://decweb.tehz.ch/WWW7/1938/com1938.htm, Nov. 10, 1998 pp. 1–12.

Article by Bharat et al. entitled "Improved Algorithms for Topic Distillation in a Hyperlinked Environment" published by Digital Equipment Corporation, Systems Research Center in 1998 9 pages.

Article by Jon M. Kleinberg entitled "Authoritative Sources in a Hyperlinked Environment" published by Proceedings of the ACM–SAIM Symposium on Discrete Algorithms, 1998, as IBM Research Report RJ 10076, May 1997, and as http://simon.cs.cornell.edu/home/kleinber/auth.ps, pp. 1–31 inlcuding abstract.

Article by Brin et al. entitled "The Anatomy of a Large–Scale Hypertextual Web Search Engine" http://google.stanford.edu/~backrub/google.html.

* cited by examiner

*Primary Examiner*—Paul R. Lintz
(74) *Attorney, Agent, or Firm*—Fenwick & West LLP

(57) ABSTRACT

A method and apparatus for preventing topic drift in queries in hyperlinked environments uses equivalence components for ranking pages containing information that is relevant to the topic of a user query input to a search engine. The method includes the step of providing a query to a search engine, where the query represents a predetermined topic; retrieving at least one page associated with the query; constructing a graph representing the pages in memory; creating at least one equivalence component representing a subset of the graph; processing each equivalence component; eliminating the equivalence component in accordance with whether it matches the predetermined topic; and ranking the remaining pages.

56 Claims, 2 Drawing Sheets

METHOD AND APPARATUS FOR PREVENTING TOPIC DRIFT IN QUERIES IN HYPERLINKED ENVIRONMENTS

CROSS REFERENCE TO RELATED APPLICATIONS

This application is related to the following co-pending U.S. patent applications Ser. No. 09/007,635 of Krishna A. Bharat and Monika R. Henzinger, entitled "Method For Ranking Hyperlinked Pages Using Connectivity and Content Analysis," filed Jan. 15, 1998; Ser. No. 09/058,577 of Krishna A. Bharat and Monika R. Henzinger, entitled "Method For Ranking Documents In A Hyperlinked Environment Using Connectivity and Selective Content Analysis," filed Apr. 9, 1998; Ser. No. 09/131,473 of Jeffrey Dean, Monika R. Henzinger and Andrei Z. Broder, entitled "Method For Identifying Related Pages In A Hyperlinked Database," filed Aug. 10, 1998; Ser. No. 09/131,469 of Jeffrey Dean and Monika R. Henzinger, entitled "Method For Identifying Near Duplicate Pages In A Hyperlinked Database", filed Aug. 10, 1998. These patent applications are incorporated herein by reference.

FIELD OF THE INVENTION

This invention relates generally to computerized information retrieval, and more particularly to preventing topic drift in queries in hyperlinked environments.

BACKGROUND OF THE INVENTION

The World Wide Web (the "Web") is an Internet client-server hypertext distributed information retrieval system. Hypertext objects, for example documents, menus, and indices, are represented in hypertext mark-up language (HTML). Hypertext links refer to other documents by their universal resource locator (URL). These links may refer to local or remote resources that may be accessible via protocols such as http, FTP, GOPHER, TELNET or news. These resources include blocks of data called web pages which may be stored on a server as a file written in HTML. Web pages are typically identified by a URL. A user may view the contents of web pages and may navigate from one page to another through the use of a web browser. A web browser is a program which allows a person to read hypertext. Examples of web browsers include Microsoft Internet Explorer and Netscape Navigator. "Microsoft", the Microsoft logo, "Internet Explorer" and all associated logos are trademarks or registered trademarks of Microsoft Corporation in the United States and other countries. "Netscape", the Netscape logo, "Navigator" and all associated logos are trademarks or registered trademarks of Netscape Communications Corporation in the United States and other countries.

A user may locate web pages having specific contents of interest through the use of a search engine. A search engine is a program that allows a user to perform key word searches for information on the Internet. Digital Equipment Corporation's AltaVista search engine (http://www.altavista.com), for example, indexes hundreds of millions of web pages maintained by computers all over the world. "Digital Equipment Corporation", the Digital Equipment Corporation logo, "AltaVista" and all associated logos are trademarks or registered trademarks of Digital Equipment Corporation in the United States and other countries.

Users provide queries to the search engine and the search engine identifies pages that match the queries, for example pages that include key words contained in the queries. The search engine may take the queries as input and provide a set of web pages in response to the user's queries. This set of pages is known as a result set.

Search engines that use keyword matching perform quite well with well-specified queries consisting of many query terms. Queries with a small result set are called narrow queries. A small result set created from a narrow query is often specific enough to satisfy the user's information needs. However, even though users may have very specific information needs, users often pose queries with only a few query terms. Queries with a large result set are called broad queries. These often arise from queries that contain very few query terms. A large result set created from a broad query may not be specific enough to satisfy the user's information needs.

Various techniques have been developed to enlarge an initial result set to produce another result set that more quickly matches the user's needs. These techniques include providing relevance feedback, analyzing the content of the pages, and analyzing the connectivity of the pages.

The Excite search engine (http://www.excite.com) is an example of a search engine that uses relevance feedback to identify a more relevant result set. "Excite" and the Excite logo are trademarks or registered trademarks of Excite, Inc. in the United States and other countries.

Users of the Excite search engine form an initial query using standard query syntax. The purpose of the query is to specify a topic of interest that may be used to determine a result set containing relevant pages. The user may examine the result set and provide relevance feedback if the result set does not satisfy the user's needs. To provide relevance feedback to the Excite search engine, the user employs the "Find Similar" option to locate a new result set containing pages that are more relevant than the pages found in the initial result set.

The Kleinberg algorithm is an example of a technique that uses connectivity analysis to identify a more relevant result set. Connectivity refers to the link structure that connects pages in a hyperlinked environment such as the Internet. See "Authoritative Sources in a Hyperlinked Environment," Proc. $9^{th}$ ACM-SIAM Symposium on Discrete Algorithms, 1998. See also IBM Research Report RJ 10076, May 1997 and "http://simon.cs.cornell.edu/home/kleinber/auth.ps."

The Kleinberg algorithm analyses the link structure, or connectivity, of Web pages in the vicinity of a result set to suggest useful pages in the context of a search that was performed. The vicinity of a Web page is defined by the hyperlinks that connect one page to other pages. The set of all links to all pages on the Internet is called the web graph. Each page may have hyperlinks pointing to other pages, and each page may be pointed to by the hyperlinks of other pages. Pages may be directly linked to other pages or indirectly linked via intermediate pages. Pages that are directly linked are considered to be close pages and pages that are linked via numerous intermediate pages are considered to be distant pages. These links define the connectivity of the pages and may be expressed as a graph where the pages are represented as nodes and the links are represented as directed edges. The number of links required to move from one page to another page provides an indication of how related or unrelated the pages are to each other. Pages that are close to each other tend to contain related topics. Pages that are distant from each other tend to contain unrelated topics.

Connectivity information is useful for increasing the size of the result set. Pages that are located a predetermined distance, usually within a few links, from an initial result set often provide results that are relevant to the input query. The enlarged result set is called a neighborhood graph. A neighborhood graph is a subset of the web graph. A neighborhood graph expresses the connectivity of pages that are located a predetermined distance away from a particular page or a result set. The neighborhood graph includes a node for each page and an edge for each link between pages, up to the predetermined distance.

The Kleinberg algorithm uses the neighborhood graph to assign hub and authority weights to each page in response to a user query. A page with a large authority weight is called a good authority page and a page with a large hub weight is called a good hub page. Hub and authority pages have a mutually reinforcing relationship. A good hub page points to many authority pages and a good authority page is pointed to by many good hub pages. The weights of the hubs and authorities provide information that is useful for ranking the nodes in the neighborhood graph. Usually the nodes are ranked according to their relevance compared to the input query or topic.

One problem with using the Kleinberg algorithm is topic drift. When a user wants to find web pages related to a particular topic, the user enters a query representing that topic into a search engine. The search engine finds a result set containing a list of web pages relating that topic. Using an algorithm like Kleinberg's algorithm, this result set is expanded to include other pages that are at a predetermined distance from the pages in the original result set. However, the content of these new pages might not be on the same topic as the original query. If pages that are not on the original query are ranked highly, then this is called "topic drift."

Topic drift may occur when using connectivity information to enlarge the size of an initial result set to include other pages that are reachable within a few links of the initial result set because pages that are one or two links away do not always match the given query. Topic drift also may occur as a result of the existence of many mutually reinforcing pages in the result set, for example if the hub and authority pages point to each other.

Thus, a need exists for a method of preventing topic drift in hyperlinked environments when an initial result set is enlarged to include pages that may better match a given user query.

SUMMARY OF THE INVENTION

The present invention provides a method and apparatus for preventing topic drift in queries in hyperlinked environments.

In accordance with a purpose of the invention, as embodied and broadly described herein, the invention relates to a method for preventing topic drift in queries in hyperlinked environments, comprising: providing a query to a search engine, wherein the query is associated with a predetermined topic; retrieving at least one page associated with the query; constructing a graph in memory, the graph including the nodes and directed edges, each node representing one of the pages, and the directed edges representing a connectivity value between the pages; ranking the pages in the graph; creating at least one equivalence component, where each equivalence component includes all equivalent nodes; processing each equivalence component; eliminating the equivalence component in accordance with whether it matches the predetermined topic; and ranking the remaining pages.

The approach of the present invention includes combining the analysis of both the content and the connectivity of web pages to improve results, implementing the content analysis efficiently by using the information found in a typical search engine, and using equivalence components to produce a wider variety of results without only giving the results from the largest equivalence component.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF A PREFERRED EMBODIMENT

Reference will now be made in detail to preferred embodiments of the invention, examples of which are illustrated in the accompanying drawings. Wherever convenient, the same reference numbers will be used throughout the drawings to refer to the same or like parts.

Figure 1:
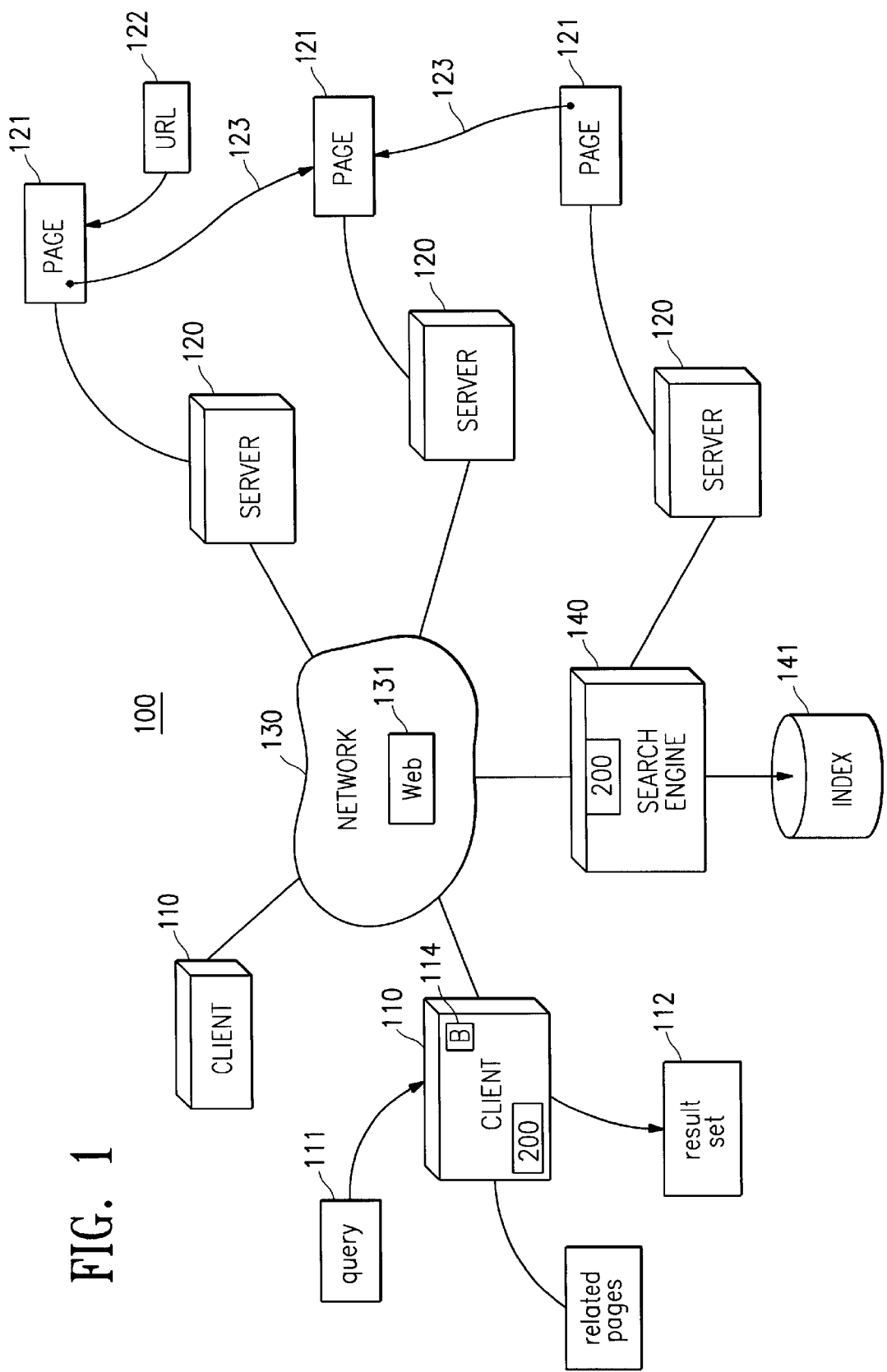
FIG. 1 shows a block diagram of a hyperlinked environment on which an embodiment of the present invention may be implemented.

FIG. 1 shows a block diagram of a hyperlinked computer environment 100 on which an embodiment of the present invention may be implemented. The hyperlinked environment 100 includes client computers 110 and server computers 120, also called hosts, connected to each other by a network 130, such as the Internet. The network 130 includes an application level interface, such as the Web.

The Web 131 allows clients to access documents such as web pages 121 which are located on and maintained by the servers 120. Clients 110 may access web pages 121 via a Web browser application program 114 that executes on the client 110. Web pages may be documents or any other linked data objects of a database having content and connectivity that may be characterized. The Web browser 114 accesses pages 121 via an associated URL 122. Hyperlinks 123 connect pages 121 to each other and may be in the form of URLs.

Users input a query 111 into a client, which in turn transmits the query to the search engine 140. The search engine 200 maintains an index 141 of Web pages 121 in a memory, for example, disk storage. The search engine 140 may store indexes 141 for millions of pages 121 in its memory. The query 111 includes at least one term or key word indicating a topic in which the user is interested. In response to the query 111, the search engine 140 returns a result set 112 to the client that contains Web pages 121 that satisfy the terms of the query 111. When query 111 is broadly specified, for example if the query 111 contains only a few terms or key words, the result set 112 may include a large number of pages that satisfy the query 111.

All of the pages contained in the result set 112 may not be related 113 to the user's actual information need. Thus, typical search engines 140 attempt to rank the pages of the result set 112 and output the pages in order of usefulness. The closeness with which the order of the entries in the result set 112 matches the user's initial query is an indicator of the usefulness of the search engine 140. A good search engine 140 returns the most useful pages before the pages that are useful.

Figure 2:
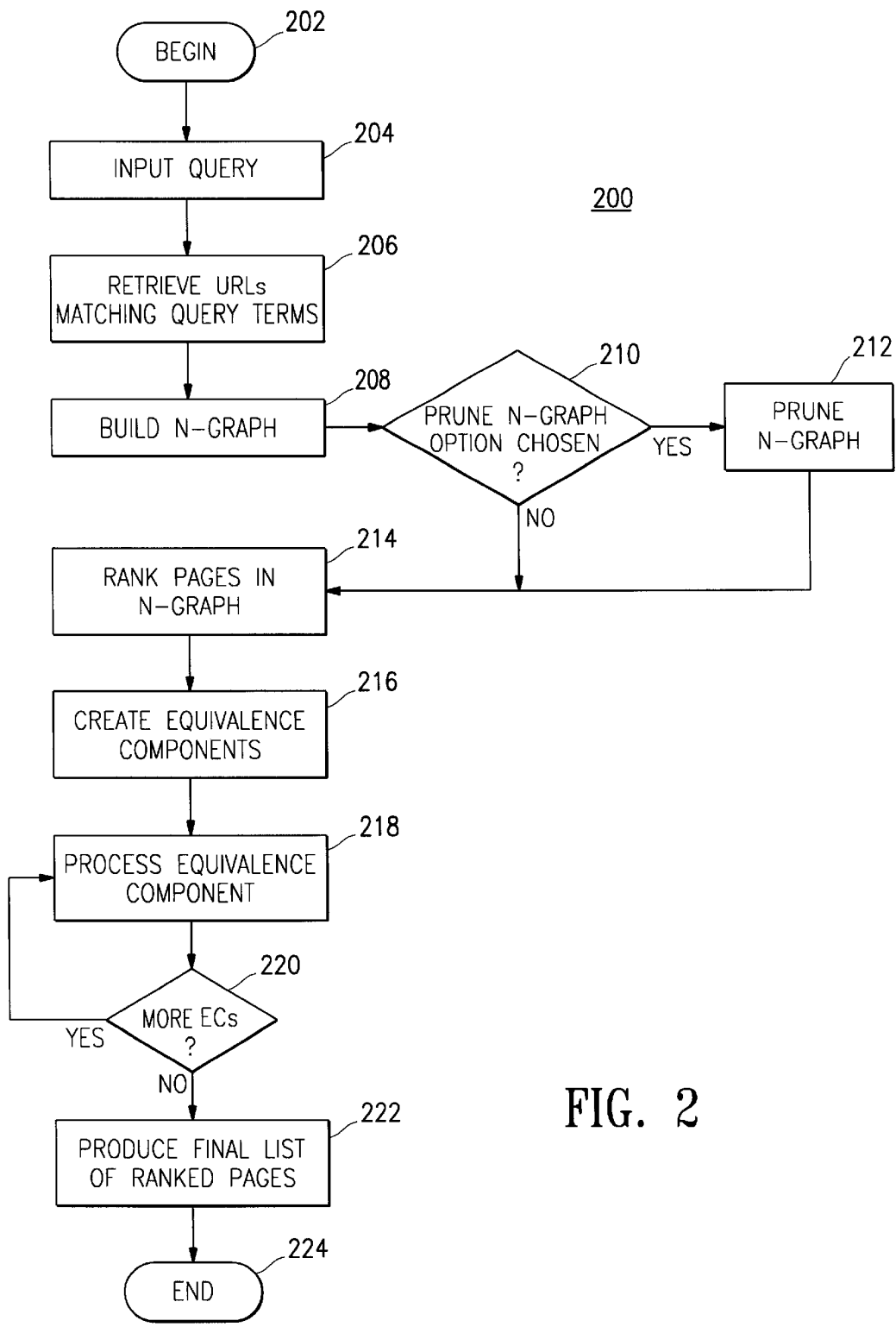
FIG. 2 is a flow chart showing an example of steps in a method for preventing topic drift according to a preferred embodiment of the present invention.

FIG. 2 is a flow chart 200 showing steps in a method for preventing topic drift according to a preferred embodiment of the present invention. Flow chart 200 begins at step 202 and continues at step 204 where a user provides an input query 111 to a search engine 140. The search engine 140, in step 206, retrieves URLs matching the terms or key words of query 111. The matching URLs make up a start set that is fairly large, and may include 2000 or more nodes, or pages, especially if the query 111 is broad.

The matching URLs are used to build a neighborhood graph (n-graph) in step 208. The n-graph is a subgraph of the web graph and contains all the nodes that are reachable by a specified set of directed paths. The nodes represent the pages and the directed paths indicate the direction of the links between the pages. The directed paths are represented by edges in the n-graph. In a preferred embodiment, the n-graph may include all nodes that are reachable by going backwards (B), forward (F), backward and then forward (BF), or forward and then backward (FB) from a node in the start set. The start set is a set of pages that are produced by a search engine in response to an initial query. The n-graph is formed by beginning with the start set and expanding outward via links to other pages to find additional pages containing useful information. However, in some cases, it may be useful to limit the number of links traversed in order to reduce the size of the n-graph.

In an embodiment of the present invention, a pruning option indicator may be implemented. After building the n-graph in step 208, this pruning option indicator is checked in step 210. If the prune option is chosen in step 210, then processing may continue at step 212 where the n-graph may be pruned according to various pruning techniques. Pruning techniques may include determining whether the individual nodes contained in n-graph are on topic. In a preferred embodiment of the present invention, the method tests the nodes that were reached via the F and BF paths to determine whether or not they are on topic. Nodes that are not on topic are discarded. Otherwise, the nodes remain in the n-graph.

There are various methods for testing whether a node is on topic. These methods include fetching the document (page) and testing whether the query terms appear in the document (page). Another method is to ask the original query with an added "AND url:\" to a search engine. If the page is returned, it is on topic. Otherwise, it is not on topic and may be discarded from the n-graph.

Another technique for determining whether a node is on topic is by issuing one or more queries to a search engine, specifying both the original query terms and the identifiers of the nodes that were not in the start set. By processing the results of the query, it may be determined which of the nodes in the expanded graph did not match the original query terms, and the non-matching nodes may be eliminated from the graph. This filtering method may be applied to all of the nodes in the graph or only to a subset of the nodes in the graph, if desired. For example, nodes that are reachable from a start node via a single backward (B) link are more likely to be off topic but may contain useful links to pages that are on topic. Hot lists are an example of such a page. A hot list is a document on the World-Wide Web or in a user's browser configuration file that contains hypertext links to notable pages on the Web. These links are often unorganized and undocumented. Therefore, it may be useful to exclude backward nodes from the filtering process. There are various other methods for testing whether a node is on topic.

After pruning is completed in step 212, processing continues at step 214. If the prune option is not selected in step 210, then the pruning option check in step 210 and the pruning step 212 are both skipped and processing continues at step 214 where the nodes (pages) of the n-graph are ranked.

Various ranking techniques may be employed to rank the pages of the n-graph in step 214. These techniques include Kleinberg's hub and authority algorithm (discussed above); the CLEVER algorithm; two methods developed by Henzinger and Dean; and two methods developed by Bharat and Henzinger.

The CLEVER algorithm is a set of extensions to Kleinberg's algorithm and has the goal of distilling the most important sources of information from a collection of pages about a topic. (See S. Chakrabarti et al., "Experiments in Topic Distillation," ACM SIGIR Workshop on Hypertext Information Retrieval on the Web, Melbourne, Australia, 1998).

One ranking method developed by Bharat and Henzinger is described in U.S. patent application Ser. No. 09/007,635, "Method for Ranking Pages Using Connectivity and Content Analysis," filed on Jan. 15, 1998. This method examines both the connectivity and the content of pages to identify useful pages. This method may fetch all pages in the neighborhood graph in order to determine their relevance to the query topic. A reason for fetching all the pages is to reduce the effect of non-relevant pages in the subsequent connectivity analysis phase.

Another ranking method developed by Bharat and Henzinger is described in U.S. patent application Ser. No. 09/058,577, "Method for Ranking Documents in a Hyperlinked Environment using Connectivity and Selective Content Analysis," filed on Apr. 9, 1998. This method may perform content analysis on only a small subset of pages in the neighborhood graph to determine relevance weights. Pages with low relevance weights may be pruned from the graph. The pruned graph may then be ranked according to a connectivity analysis. All of the above-described ranking techniques are incorporated herein by reference.

After the n-graph is built and optionally pruned in steps 208–212, the nodes in the n-graph are ranked in step 214. Processing continues at step 216 where the equivalence components are identified using the edges of the n-graph in an undirected manner. An equivalence component is a maximum set of nodes that are equivalent. Two nodes may be defined equivalent in many ways. For example, two nodes may be equivalent if they are connected by a path in the undirected version of the neighborhood graph. Another example where two nodes may be equivalent is if they are connected by a path that alternates between forward and backward edges. Such a path is called a "zig-zag" path.

Each equivalence component that is created in step 216 is then examined in step 218. For each equivalence component, a determination is made as to whether that component is on topic or not. A component may be off topic if the optional pruning step is omitted or because the pruning step, if chosen, only examines a subset of the nodes in the n-graph.

Various techniques may be employed to examine the nodes contained in each equivalence component and to determine whether they are on topic. For example, the nodes may be randomly sampled. Alternatively, the N highest ranked pages in the equivalence component may be tested. In either case, the proportion of on topic pages to total pages tested is calculated. If the proportion is below a specified threshold level, for example 50%, then all of the nodes in the entire component would eliminated from the neighborhood graph. The reason for eliminating the entire component is the assumption that too many of the nodes contained in the component were off topic and that its authority ranking results are therefore suspect.

After each equivalence component ("EC") is examined in step 218, a check is performed to determine whether there are more equivalence components to process in step 220. If there are any components that have not been examined, then processing returns to step 218. Otherwise, if all equivalence components have been examined, then processing continues at step 222, in which a final list of ranked pages is produced.

In step 222, the results are ordered by taking the top few rated pages from each component and using them to construct a final ordered list of ranked pages. By choosing nodes that have a lower absolute authority score but are the best ranked pages in a component, the problem of choosing all the highest ranked nodes from a single component simply because that component was the largest component on the graph is avoided.

Some of the advantages of the approach of the present invention include combining the analysis of both the content and the connectivity of web pages to improve results, implementing the content analysis efficiently by using the information found in a typical search engine, and using equivalence components to produce a wider variety of results without only giving the results from the largest equivalence component.

In summary, a method and apparatus for preventing topic drift in queries in hyperlinked environments uses equivalence components for ranking pages containing information that is relevant to the topic of a user query to a search engine. The method includes the step of providing a query to a search engine, where the query represents a predetermined topic; retrieving at least one page associated with the query; constructing a graph in memory representing the pages; creating at least one equivalence component representing a subset of the graph; processing each equivalence component; keeping or eliminating the equivalence component in accordance with whether it matches the predetermined topic; and ranking the remaining pages.

The step of ranking the pages may be performed using a connectivity analysis such as a Kleinberg algorithm, a content analysis, or both a connectivity and a content analysis. The content analysis may be selective. Also, the step of constructing the graph in memory may include selecting a prune option indicating that the contents of the graph should be pruned before the graph is constructed.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for preventing topic drift in queries in hyperlinked environments, comprising:
   providing a query to a search engine, wherein the query is associated with a predetermined topic;
   retrieving at least one page associated with the query;
   constructing a graph in memory, the graph including nodes and edges, each node representing one of the pages, and the edges representing a connectivity value between the pages;
   ranking the nodes in the graph;
   creating at least one equivalence component, wherein each equivalence component includes equivalent nodes;
   examining at least one node in each equivalence component to determine whether the at least one node matches the predetermined topic;
   eliminating the equivalence component if the node does not match the predetermined topic; and
   ranking the remaining nodes.

2. The method of claim 1, wherein ranking the pages is performed via a connectivity analysis.

3. The method of claim 2, wherein the connectivity analysis is a Kleinberg algorithm.

4. The method of claim 2, wherein ranking the pages further includes ranking the pages via a content analysis.

5. The method of claim 4, wherein the content analysis is selective.

6. The method of claim 1, wherein the step of constructing the graph further includes:
   determining the status of a prune option;
   pruning the graph in accordance with the prune option.

7. The method of claim 1, wherein the edges are directed in at least one of a forward and a backward direction.

8. The method of claim 1, wherein the equivalent nodes are those that are connected in the graph.

9. The method of claim 7, wherein equivalent nodes are connected by alternating backward and forward edges.

10. The method of claim 1, wherein eliminating the equivalence component if the node does not match the predetermined topic further includes:
   calculating a proportion of on topic nodes to total number of nodes; and
   eliminating the equivalence component if the proportion is less than a predetermined threshold value.

11. The method of claim 10, wherein the predetermined threshold value is 50%.

12. The method of claim 10, wherein examining at least one node in each equivalence component includes selecting a node at random.

13. The method of claim 10, wherein examining at least one node in each equivalence component includes selecting the N highest ranked pages, wherein N is a predetermined limit.

14. A system for preventing topic drift in queries in hyperlinked environments, comprising:
   circuitry configured to provide a query to a search engine, wherein the query is associated with a predetermined topic;
   circuitry configured to retrieve at least one page associated with the query;
   circuitry configured to construct a graph in memory, the graph including nodes and edges, each node representing one of the pages, and the edges representing a connectivity value between the pages;
   circuitry configured to rank the nodes in the graph;
   circuitry configured to create at least one equivalence component, wherein each equivalence component includes equivalent nodes;
   circuitry configured to examine at least one node in each equivalence component to determine whether the at least one node matches the predetermined topic;

circuitry configured to eliminate the equivalence component if the node does not match the predetermined topic; and circuitry configured to rank the remaining nodes.

15. The system of claim 14, wherein the circuitry configured to rank the pages further includes circuitry configured to perform a connectivity analysis.

16. The system of claim 15, wherein the connectivity analysis is a Kleinberg algorithm.

17. The system of claim 15, wherein the circuitry configured to rank the pages further includes the circuitry configured to rank the pages via a content analysis.

18. The system of claim 17, wherein the content analysis is selective.

19. The system of claim 14, wherein the circuitry configured to construct the graph further includes:

circuitry configured to determine the status of a prune option;

circuitry configured to prune the graph in accordance with the prune option.

20. The system of claim 14, wherein the edges are directed in at least one of a forward and a backward direction.

21. The system of claim 14, wherein the equivalent nodes are those that are connected in the graph.

22. The system of claim 20, wherein equivalent nodes are connected by alternating backward and forward edges.

23. The system of claim 14, wherein the circuitry configured to eliminate the equivalence component if the node does not match the predetermined topic further includes:

circuitry configured to calculate a proportion of on topic nodes to total number of nodes; and circuitry configured to eliminate the equivalence component if the proportion is less than a predetermined threshold value.

24. The system of claim 23, wherein the predetermined threshold value is 50%.

25. The system of claim 23, wherein the circuitry configured to examine at least one node in each equivalence component includes circuitry configured to select a node at random.

26. The system of claim 23, wherein the circuitry configured to examine at least one node in each equivalence component includes circuitry configured to select the N highest ranked pages, wherein N is a predetermined limit.

27. An apparatus for preventing topic drift in queries in hyperlinked environments, comprising:

means for providing a query to a search engine, wherein the query is associated with a predetermined topic;

means for retrieving at least one page associated with the query;

means for constructing a graph in memory, the graph including nodes and edges, each node representing one of the pages, and the edges representing a connectivity value between the pages;

means for ranking the nodes in the graph;

means for creating at least one equivalence component, wherein each equivalence component includes equivalent nodes;

means for examining at least one node in each equivalence component to determine whether the at least one node matches the predetermined topic;

means for eliminating the equivalence component if the node does not match the predetermined topic; and means for ranking the remaining nodes.

28. The apparatus of claim 27, wherein the means for ranking the pages is performed via a connectivity analysis.

29. The apparatus of claim 28, wherein the connectivity analysis is a Kleinberg algorithm.

30. The apparatus of claim 28, wherein the means for ranking the pages further includes means for ranking the pages via a content analysis.

31. The apparatus of claim 30, wherein the content analysis is selective.

32. The apparatus of claim 27, wherein the means for constructing the graph further includes:

means for determining the status of a prune option;

means for pruning the graph in accordance with the prune option.

33. The apparatus of claim 27, wherein the edges are directed in at least one of a forward and a backward direction.

34. The apparatus of claim 27, wherein the equivalent nodes are those that are connected in the graph.

35. The apparatus of claim 33, wherein equivalent nodes are connected by alternating backward and forward edges.

36. The apparatus of claim 27, wherein the means for eliminating the equivalence component if the node does not match the predetermined topic further includes:

means for calculating a proportion of on topic nodes to total number of nodes; and means for eliminating the equivalence component if the proportion is less than a predetermined threshold value.

37. The apparatus of claim 36, wherein the predetermined threshold value is 50%.

38. The apparatus of claim 36, wherein the means for examining at least one node in each equivalence component includes means for selecting a node at random.

39. The apparatus of claim 36, wherein the means for examining at least one node in each equivalence component includes means for selecting the N highest ranked pages, wherein N is a predetermined limit.

40. A computer program product, comprising:

a computer usable medium having computer code embodied therein for preventing topic drift in queries in hyperlinked environments, comprising:

computer readable program code devices configured to cause a computer to effect providing a query to a search engine, wherein the query is associated with a predetermined topic;

computer readable program code devices configured to cause a computer to effect retrieving at least one page associated with the query;

computer readable program code devices configured to cause a computer to effect constructing a graph in memory, the graph including nodes and edges, each node representing one of the pages, and the edges representing a connectivity value between the pages;

computer readable program code devices configured to cause a computer to effect ranking the nodes in the graph;

computer readable program code devices configured to cause a computer to effect creating at least one equivalence component, wherein each equivalence component includes equivalent nodes;

computer readable program code devices configured to cause a computer to effect examining at least one node in each equivalence component to determine whether the at least one node matches the predetermined topic;

computer readable program code devices configured to cause a computer to effect eliminating the equivalence component if the node does not match the predetermined topic; and computer readable program code devices configured to cause a computer to effect ranking the remaining nodes.

41. The computer program product of claim 40, wherein the computer readable program code devices configured to cause a computer to effect ranking the pages is performed via a connectivity analysis.

42. The computer program product of claim 41, wherein the connectivity analysis is a Kleinberg algorithm.

43. The computer program product of claim 41, wherein the computer readable program code devices configured to cause a computer to effect ranking the pages further includes computer readable program code devices configured to cause a computer to effect ranking the pages via a content analysis.

44. The computer program product of claim 43, wherein the content analysis is selective.

45. The computer program product of claim 30, wherein the computer readable program code devices configured to cause a computer to effect constructing the graph further include:

computer readable program code devices configured to cause a computer to effect determining the status of a prune option;

computer readable program code devices configured to cause a computer to effect pruning the graph in accordance with the prune option.

46. The computer program product of claim 40, wherein the edges are directed in at least one of a forward and a backward direction.

47. The computer program product of claim 40, wherein the equivalent nodes are those that are connected in the graph.

48. The computer program product of claim 46, wherein equivalent nodes are connected by alternating backward and forward edges.

49. The computer program product of claim 40, wherein the computer readable program code devices configured to cause a computer to effect eliminating the equivalence component if the node does not match the predetermined topic further include:

computer readable program code devices configured to cause a computer to effect calculating a proportion of on topic nodes to total number of nodes; and computer readable program code devices configured to cause a computer to effect eliminating the equivalence component if the proportion is less than a predetermined threshold value.

50. The computer program product of claim 49, wherein the predetermined threshold value is 50%.

51. The computer program product of claim 49, wherein the computer readable program code devices configured to cause a computer to effect examining at least one node in each equivalence component include computer readable program code devices configured to cause a computer to effect selecting a node at random.

52. The computer program product of claim 49, wherein the computer readable program code devices configured to cause a computer to effect examining at least one node in each equivalence component include computer readable program code devices configured to cause a computer to effect selecting the N highest ranked pages, wherein N is a predetermined limit.

53. The method of claim 3, wherein the prune option determines whether a page in the graph matches the original query terms.

54. The system of claim 19, wherein the prune option determines whether a page in the graph matches the original query terms.

55. The apparatus of claim 32, wherein the prune option determines whether a page in the graph matches the original query terms.

56. The computer program product of claim 43, wherein the prune option determines whether a page in the graph matches the original query terms.

* * * * *